March 12, 1940. C. N. MONTEITH ET AL 2,193,139
RETRACTABLE BOMB RACK
Filed Feb. 12, 1936 4 Sheets-Sheet 2
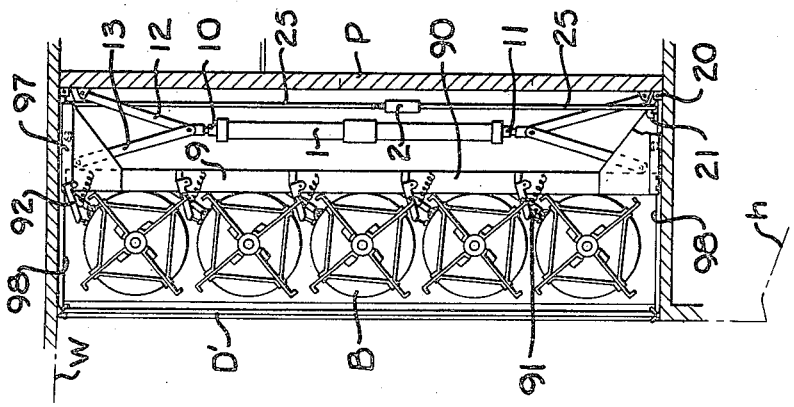
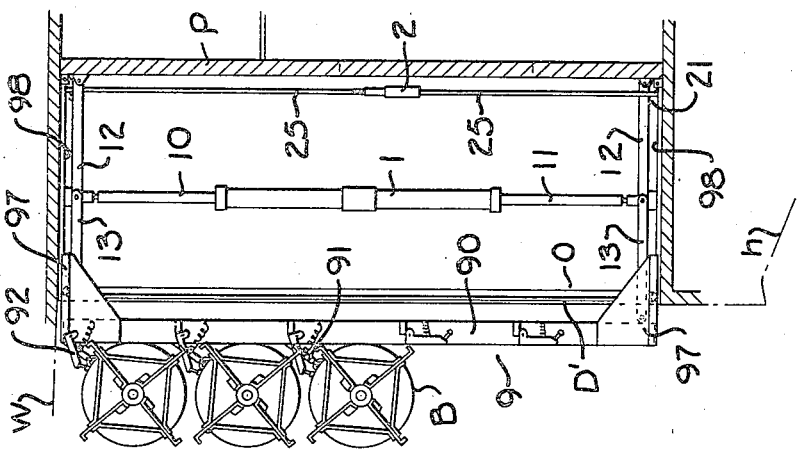
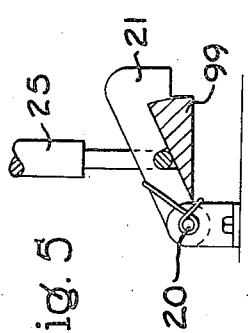
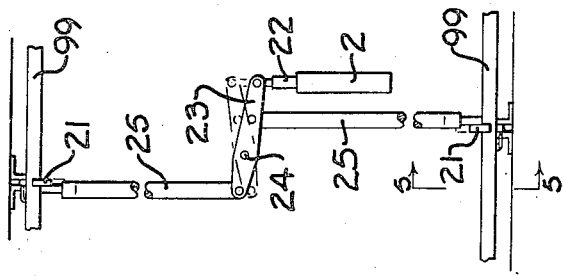
Inventor
Charles N. Monteith
Elliott G. Emery, Jr.
By Charles L. Reynolds
Attorney

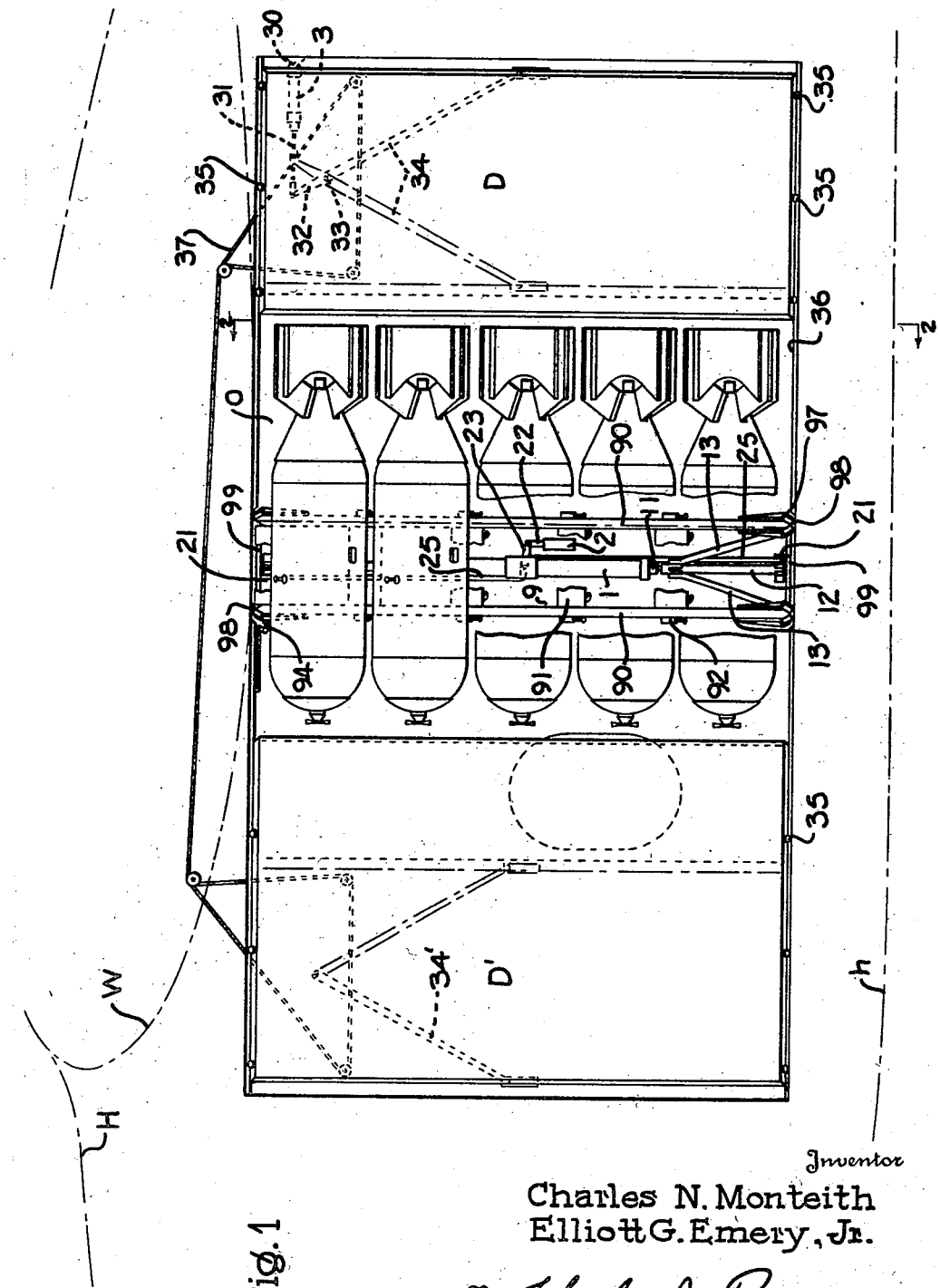

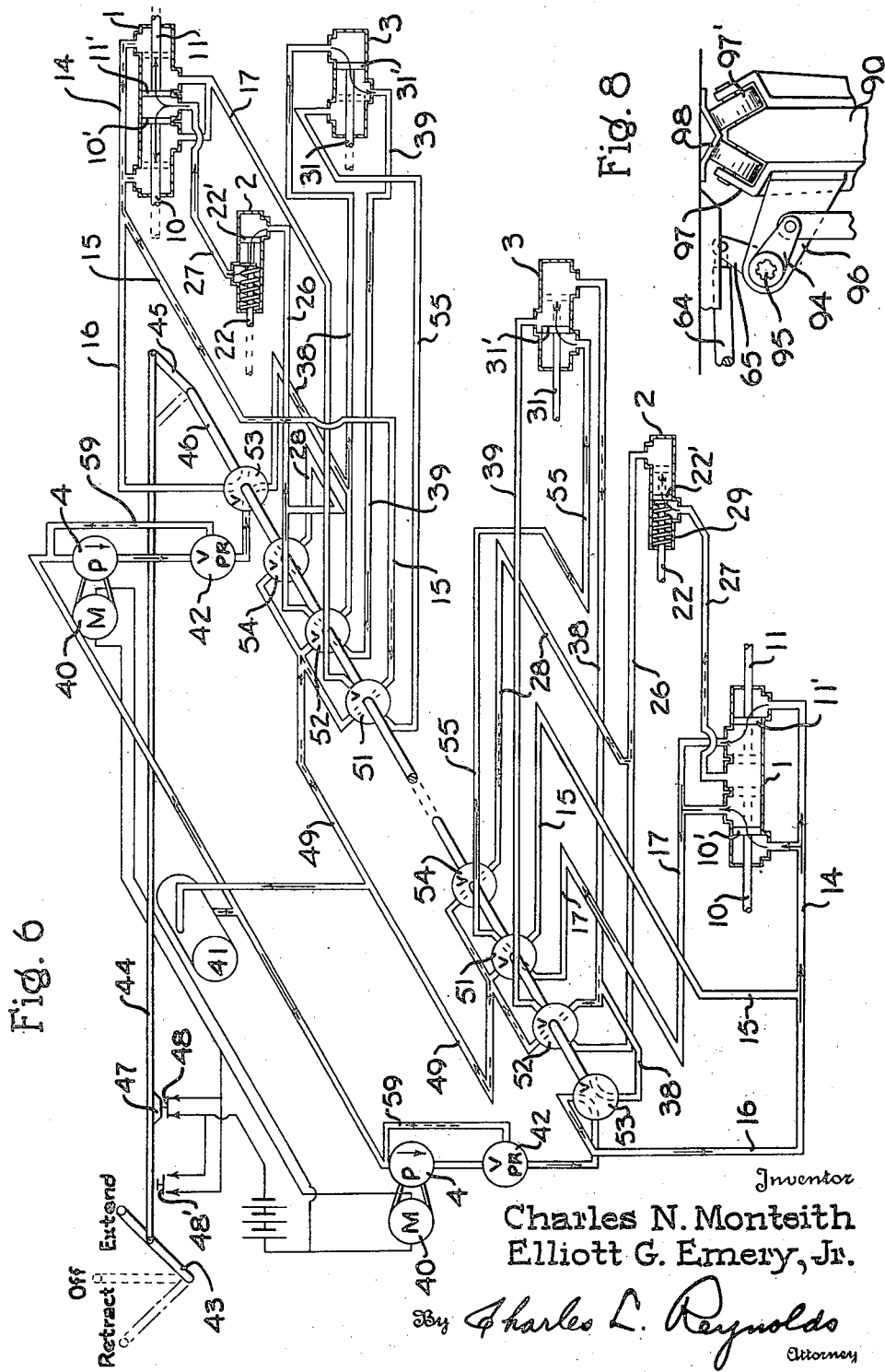

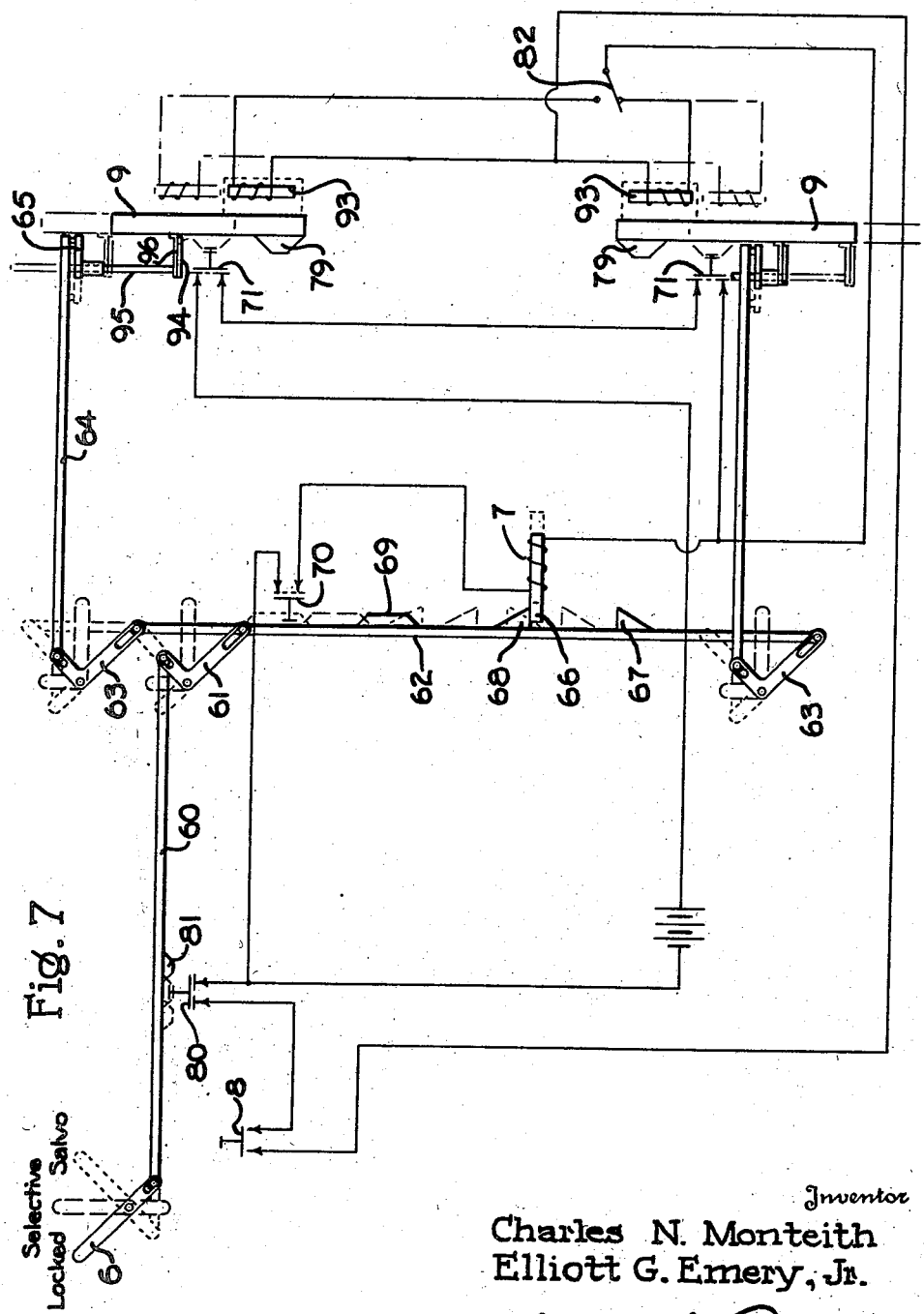

Patented Mar. 12, 1940

2,193,139

UNITED STATES PATENT OFFICE 2,193,139

RETRACTABLE BOMB RACK

Charles N. Monteith and Elliott G. Emery, Jr., Seattle, Wash., assignors, by mesne assignments, to The Pacific National Bank of Seattle, Seattle, Wash., a national banking association Application February 12, 1936, Serial No. 63,582

13 Claims. (Cl. 89—1.5)

This invention relates to armament installations in aircraft, and more particularly to airplane bomb racks. It is especially designed for use in flying boats, but certain principles to be disclosed may be employed to advantage in land-type airplanes.

The present invention does not pertain to the immediate mechanism for supporting and releasing the bombs, usually termed the bomb rack, and the present invention may be used with any suitable bomb rack. A rack of any type known in the art may be employed with and controlled by this invention.

In a land-type airplane the bomb rack may be fixed within the aircraft structure—the fuselage, for example—and the bombs may be dropped through an opening in the structure immediately below. Land planes are limited as to size and carrying capacity by the size of and clear space around the field, often temporary or improvised in war time, from which they operate, and in order to obtain maximum range and carrying capacity it may be necessary to employ flying boats, for they may find ample take-off space without previous preparation. In a flying boat it is not feasible to drop the bombs through a bottom opening in the hull. The bombs are large, and it is not practicable to make an opening in the bottom of the hull through which to drop bombs. It is not desirable, either, to support the bombs exteriorly—say, beneath the wing—as there they create drag and reduce the speed of the airplane. As relates to flying boats, therefore, it is a problem to make provision for carrying bombs within the aircraft structure, preferably using a rack in which they may be supported one above another and from which they can be dropped directly, yet to avoid the necessity of leaving any opening in the bottom—the planing surface—of the hull.

This can be accomplished, according to the present invention, by projecting the bomb rack laterally through an opening in the side of the hull, prior to release of the bombs therefrom. While this requires an opening in the hull of a size to pass the complete bomb rack, such opening can be wholly or largely above the water line, and in any event it does not interrupt the smooth bottom planing surfaces.

Such an opening in the side of the hull, if left open during normal flight, or indeed, a hole in the bottom of the fuselage or wing of a land-type airplane of sufficient size to permit dropping of bombs from a rack fixed within, would create undesirable drag. It is not new to provide closable doors for openings in aircraft structures generally, and doors can be used for the purpose of closing these openings, yet in either instance—flying boats or land-type planes—it complicates the problem of dropping the bombs, since safety dictates that means must be provided to insure that no bomb can be released from the bomb rack before the doors are opened. If in addition the rack must be projected laterally outwardly, additional means must be provided to insure that, notwithstanding opening of the doors, no bomb will be released until, in addition, the rack is fully and properly projected. In the latter case, further means must be provided to insure that the projection of the rack will not occur before the doors are open sufficiently that the rack or the bombs thereon will not strike or otherwise interfere with the door. In addition, the doors must be prevented from closing before the rack has been retracted.

Bombs are customarily discharged from such racks alternatively by one of two possible means—the normal selective release means whereby one bomb is released at a time, and usually by electrical control, or the salvo release means whereby all bombs are released substantially simultaneously, and usually by a manual control. It follows that the aforesaid safety means must be so coupled to the selective release means and to the salvo release means that neither of the latter will be operative until, in either case, the doors are open, and where the bomb rack is projectible, until the rack is fully projected.

The objects of this invention are, therefore, to provide a construction capable of accomplishing the ends above. In addition, it is an object to devise such a construction which fulfills the requirements of minimum weight, adequate strength, and maximum reliability.

Other objects, and particularly such as pertain to mechanical and structural details, will be understood as this specification progresses.

Our invention comprises the novel arrangement and combination of the bomb rack with an aircraft structure, and the novel combination and arrangement of controls with the bomb rack and with other aircraft structure, all as will appear in the accompanying drawings, in this specification, and in the claims at the end of the same.

In the accompanying drawings we have illustrated our invention in a form which is at present preferred by us, it being understood that various changes may be made in the specific form of parts and controls, and in the combination and relative arrangement thereof, without departing from the spirit of the invention.

Figure 1 is a side elevation of the hull of a flying boat, shown in dot-dash lines, illustrating the doors open and the bomb rack ready to be projected.

Figure 2 is a transverse section on the line 2—2 of Figure 1, showing the rack projected into bomb-dropping position, and Figure 3 is a similar section showing the rack retracted.

Figure 4 is an elevation, taken from the viewpoint of Figure 1, showing details of the rack locking mechanism, and Figure 5 is a section on line 5—5 of Figure 4, illustrating a further detail of the same.

Figure 6 is an isometric diagram of the fluid pressure controls, showing the controls for moving the doors, the bomb rack lock, and the bomb rack itself.

Figure 7 is a diagrammatic illustration of the electrical and safety controls associated with the bomb rack and with the firing or bomb-releasing devices.

Figure 8 is a detail view illustrating the connection of certain bomb-releasing devices to the movable bomb rack, taken from the viewpoint of Figure 1.

The bomb rack is generally indicated by the numeral 9; the one illustrated is known in the art, although any suitable type may be employed. The bombs are supported one above another in this rack, dropping by gravity from the rack as one or the other of the release mechanisms is actuated. Since the bottom of a flying boat hull is a planing surface, and part of a displacement body, it is not practicable to leave an opening in this bottom, nor is it practicable to close such an opening with doors, in such manner that the surface is completely restored, unbroken, and water-tight. Accordingly the bomb rack 9 is carried in the hull of a flying boat, the top of which is indicated at H, and the bottom of which is indicated at h, and in the side of the hull there is formed an opening O which in most installations, though not strictly necessarily, would be closed by a door or doors D and D'. The opening as shown is entirely below the wing W, so that the bombs may be carried compactly close to the center of gravity of the airplane. It will be understood that normally two such bomb racks would be provided, one at each side of the hull.

A detail description of the bomb rack is not believed to be necessary, other than, as shown, it comprises two uprights 90 between which bomb shackles 91 are pivotally supported and upon which bomb sway braces 92 are likewise pivotally carried, the rack having associated with it two forms of bomb releasing mechanism, a selective release mechanism electrically controlled through the solenoid 93 to drop each single bomb in succession with each energization of the solenoid, and a salvo release mechanism whereby all bombs may be dropped substantially simultaneously through the operation of manual mechanism terminating in an arm 94 splined to a shaft 95 and carried between brackets 96 on one or both of the uprights 90 (see Figure 8).

Each such rack is provided with a guide 97 extending transversely of the aircraft structure and carrying rollers 97' (see Figure 8) bearing upon a track 98, whereby the rack, with its bombs B, may be moved inwardly and outwardly transversely of the aircraft structure from the retracted position of Figure 3 to the projected or bomb-dropping position of Figure 2.

As an example of suitable means to accomplish this movement of the bomb rack there is illustrated the pressure cylinder 1, preferably provided with two pistons 10' and 11', the respective piston rods 10 and 11 of which are each connected to toggle links 12 and 13, at top and bottom respectively of the bomb compartment. The link 12 is pivoted upon the aircraft structure, as for example upon the partition P, and the link 13 is pivotally connected to the bomb rack 9. Fluid conduits have been omitted except in the diagrammatic showing of Figure 6, and electrical connections have been omitted except in the diagrammatic showing of Figure 7, but it will be understood that pressure fluid is supplied to the cylinder 1, at its center, serving to separate the piston rods 10 and 11, and thus to spread the toggle links 12 and 13, and to project the rack 9 from the retracted position of Figure 3 to the bomb-dropping position of Figure 2. When it is desired to retract the rack, the pressure fluid is admitted to both ends of the cylinder, exhausting at the center as shown in Figure 6, and as will be later described in detail.

In order to hold the rack in its retracted position until the time has arrived to permit it to be projected, suitable locking means are provided. Thus in Figures 4 and 5 are shown spring-held locking dogs 21, pivoted at 20 at the inner end of the bomb compartment, at top and bottom thereof. These are positioned to engage a cross member 99 of the bomb rack, and thus to hold the bomb rack against projection until the locks 21 are released. To accomplish this release we have illustrated a cylinder 9 having a piston 22' (Figure 6), the piston rod 22 of which is suitably connected to the dogs 21 to accomplish their release. Thus in Figure 4 the piston rod 22 is connected to a lever 23 pivoted at a fixed point within the bomb compartment at 24, and connecting by links 25 to the upper and lower dogs 21. Movement of the piston rod 22 from the full line to the dash line position of Figure 4 accomplishes release of the locking dogs 21. The connections to the pressure cylinder 2 are illustrated only in the diagrammatic showing of Figure 6. The cross bar 99 of the rack is beveled so that it will automatically reengage with the locking dogs 21, the latter having been dropped from their releasing position, above the level of the cross bar, prior to or at the time when the rack returns to its retracted position, by an arrangement which will be described later.

The doors D and D' are also preferably controlled by a pressure cylinder 3, supported at one end, as indicated at 30, upon the aircraft structure, and having a piston 31' with its piston rod 31 connected to the short arm 32 of a lever pivoted at 33 within the aircraft structure. The long arm 34 of this lever is connected to the door D. With the door closed, the lever arm 34 stands in the dot-dash position of Figure 1, and upon projection of the plunger 31 this arm is swung to the dotted line position of that figure wherein the door is open, rollers 35 guiding it along tracks 36. Where a companion door is also to be moved, such as the door D', this may be provided with a lever 34', and the lever arms 34 and 34' may be connected by an endless cable 37 connected to each and extending over suitable guide pulleys, as illustrated in Figure 1, so that opening movement of the door D accomplishes simultaneous opening movement of the door D', the two doors moving the same distance in the arrangement shown, though it will be obvious that by connecting the cable at different distances along the arms 34 and 34' a differential movement of the doors may be accomplished, if desired. Thus the movement of both doors is accomplished through the medium of the pressure cylinder 3.

As has been pointed out, the rack must not be permitted to move from the retracted position of Figure 3 until the doors have fully opened, nor must the doors start to close until the rack is fully retracted, and locked in place. To accomplish these ends the several pressure cylinders 1, 2 and 3 are interconnected through controls to be described, so that they can only operate in the sequence indicated. Such controls are indicated in Figure 6, and in this figure, in order to illustrate the projecting and the retracting operations, the pressure systems and controls for the two sides, that is, for the two racks, one on each side of the aircraft, have been shown, the one in the projecting position, the other in the retracting position, although in actual operation it is intended that both racks shall be projected at one time, and both shall be retracted at one time. The controls at the upper part of Figure 6 are shown in the retracted position at the initiation of the projecting action, which is carried through automatically, and the controls in the lower part of the figure are shown in the projected position, with the controls set for initiation of the retracting action, which also is carried through automatically in sequence.

Pressure is produced in the pressure system, including the cylinders 1, 2 and 3, in any suitable way, as by a pump 4 driven by a motor 40 to draw a liquid, as oil, from a reservoir 41 to deliver it past a relief valve 42, and thence into the pressure system. Before describing this system, however, it may be pointed out that a separate pump may be provided for each bomb rack, that is, for the bomb rack on each side of the aircraft, and that the operations of projection and retraction are controlled by suitable means, such as the handle 43 shiftable from a neutral or "off" position to either a retracted position or to an extended or projected position. In the arrangement shown, a link 44 is movable by the handle 43, and through an arm 45 controls a rock shaft 46 carrying a plurality of valve bodies. The link 44 or some equivalent part of the control system carries a cam 47 by means of which a switch 48 or 48' may be closed, these switches being so positioned that they are open in the "off" position, and closed only in the extending or in the retracting positions of the handle 43, and when the handle is in either one of these two latter positions the motors 40 are energized through a suitable circuit, as shown, connecting them to a battery or other source of current, and driving the pump 4 only at such times.

On the rock shaft 46 are valve bodies 51, 52, 53 and 54, having the ports in them as indicated in Figure 6, in association with the passages indicated. It is believed that it will not be necessary to describe these passages in detail, and that the invention will be better understood by following out the operations of projection and retraction of the rack.

Referring first to the upper part of Figure 6, wherein the rack is retracted and locked in such position and the doors are closed, but the valves are set to initiate the projecting operation, fluid from the pump 4 passes first through a port in the valve 53, through a conduit 38, whence it enters one end of the door cylinder 3, acting upon the piston 31' therein to move it to the left, and only after it has moved a sufficient distance to uncover a port leading to conduit 39 does the piston stop, this movement of the piston accomplishing opening of the door. The fluid from the pump is now permitted to flow through the uncovered port, through conduit 39 and through the valve body 52 through a conduit 26 connected to the lock cylinder 2, upon entering which the fluid forces the piston 22' to the left a sufficient distance to unlock the locks 21, whereupon a port leading to conduit 27 is uncovered leading to the center of the rack cylinder 1. In this cylinder the fluid forces the pistons 10' and 11' apart until they uncover ports leading to a conduit 14 having two branches 15 and 16, the branch 16 being closed at the valve 53 and the branch 15 being open through the valve 51. The fluid is permitted to return from the valve 51 through the conduit 49 to the reservoir 41, whence it may be returned to the pump as required.

It will be noted that there is connected to the cylinder 3 a conduit 55 connected to the valve 51, but in the position of valves in the upper part of Figure 6 this conduit is closed off, and no fluid may flow therethrough. It will also be noted that the conduit 26 has a branch 28 leading to the valve 54, but this is closed at the valve, hence no fluid may flow therethrough. There is also connected to the cylinder 1 a conduit 17 connecting to the valve 51, but this conduit is closed at the valve.

Referring now to the lower part of Figure 6, where the pistons 1, 2 and 3 are shown in the rack-extended position, but the valves are set at 90° to their setting in the upper part of the figure, to accomplish retraction of the rack, fluid from the pump 4 passes through the valve 53, thence through the conduit 16, and, the branch 15 being closed at the valve 51, through the conduit 14 to the outer ends of the pistons 10' and 11' in the rack cylinder 1, so that the first action is to push these pistons together, thereby retracting the rack. Fluid which was between the plungers 10' and 11' leaves through two conduits, 27 and 17. That leaving by conduit 27 enters lock cylinder 2 on the left hand side of piston 22' because the pressure on the right hand side of this piston has been relieved through conduits 26 and 28 and valve body 54, into conduit 49 and thence into reservoir 41, allowing the spring 29 to move the piston 22' past the port opening toward the locked position. The fluid therefore forces piston 22' to the right into the locked position. The fluid leaving the cylinder 1 through the conduit 17 goes through the valve 51, thence through the conduit 55 to the left hand end of the door cylinder 3, moving the piston 31' to the right or toward closed position. Fluid at the right hand side of the piston 31' cannot leave by the conduit 39 as this is closed at the valve 52, but leaves through the conduit 38, and through the valve 52 back to the conduit 49 and thence to the reservoir 41. Thus it will be seen that there is accomplished in sequence the complete retraction of the rack accompanied by movement of the lock toward locked position, and then the closure of the doors. It is immaterial that the lock may reach its locked position before the rack is fully retracted, as the locking dog 21 may ride upon the beveled member 90 as the rack reaches its retracted position, whereupon the spring-held locking dog 21 automatically engages therewith. The volumes of the several cylinders, and the location of their ports, are so proportioned and arranged to accomplish the operations in the sequences given, and to prevent their operation in any other sequence.

If the control handle 43 should not be moved to the "off" position immediately upon completion of the retracting or projecting movement no harm will occur, as pressure developed by the pump 4 will be relieved through the valve 42 and by-passed back to the intake side of the pump through the by-pass 59. Furthermore, continued circulation of the fluid through the several cylinders will only serve to hold parts in the positions to which they have been moved.

As has already been explained, bombs are released from such racks in one of two ways, either by salvo release, which is preferably accomplished by manual connections to release all bombs substantially simultaneously, or by selective release of one bomb at a time, a bomb being released upon each pressure of an electrical firing key. The latter is, of course, the normal manner of release of the bombs, but it is necessary to provide for salvo release for tactical or emergency reasons. It becomes necessary, therefore, to provide against release of bombs either in the selective manner or by salvo unless and until the bomb rack is in its fully projected position, which further implies that the doors must be open, and in this connection it may be noted that if the bomb rack is of the type which is fixed within the aircraft to drop bombs through an opening below it, which opening is normally closed by a door, these controls and safety devices may be so arranged that a bomb can not be dropped until the door is open, as is implied if the door must open before the bomb rack is projected and the bomb can not be dropped until the rack is projected.

Referring to Figure 7, two bomb racks are indicated diagrammatically at 9, representing the bomb racks at each side of the aircraft. Associated with each of these is a solenoid 93 which represents the selective release mechanism. An arm 94 is also shown associated with each rack and splined to the shaft 95, as previously described, the shaft extending parallel to the path of movement of the associated bomb rack, and this represents the salvo release mechanism. The arm 94 is suitably connected to salvo release mechanism on the bomb rack, which per se is not part of this invention, and therefore need not be illustrated. Control of the manner of release and of the bomb rack generally, except as to its movement between extended and retracted positions, is suitably accomplished by a control handle 6, which is movable from a locked to a selective and then to a salvo position. The selective position of parts is shown in dash lines, and the salvo position in dotted lines. This control handle 6 is connected through a link 60 and a bell crank 61 to a slide 62, which in turn is connected through bell cranks 63, links 64, and arms 65, the latter fixed on the respective shafts 95, to the salvo release mechanism on the individual bomb racks. Though the arms 65 and 94 are moved from the locked position to the selective position, salvo release is not accomplished, nor is salvo release accomplished during movement from the selective to the salvo position, nor until parts finally reach the salvo position.

Accordingly, to prevent salvo release of the bombs it is necessary to provide stop means whereby some part of the salvo release or control mechanism may not reach the final salvo position. To this end there is provided a stop pin 66 adapted to be positioned between two stop shoulders 67 and 68 on the slide 62, and releasable by a solenoid 7 under certain conditions. The stop pin 66 lies in the path of movement of the shoulder 67 as it moves from locked to selective position, and as it moves from selective to salvo position, engaging the shoulder 67 prior to the latter reaching the final salvo position, so that salvo release is prevented until the stop pin 66 has been withdrawn by energization of the solenoid 7. The solenoid 7 is connected in a circuit which includes the normally open switch 70, which is adapted to be closed by a cam 69 on the slide 62 by movement of the slide past the selective position and towards the salvo release position. Closure of the switch 70, however, will not alone effect salvo release of the bombs, but the solenoid 7 is also in circuit with two normally open switches 71 disposed adjacent the path of movement of the respective bomb racks 9, to be engaged by a cam 79 on each bomb rack only as the bomb rack reaches its projected or bomb-dropping position. It follows, then, that the two switches 71 must both be closed, and the switch 70 must also be closed, before the bombs can be salvo-released, which insures that the bomb racks will be in bomb-dropping position before salvo release can be accomplished, and that the control handle 6 can not be moved into the salvo-released position unless and until the bomb racks are in the bomb-dropping position (which implies that the doors must also be open), such movement being interdicted by the stop pin 66 engaging the stop shoulder 67 prior to movement of parts into the salvo release position.

The firing key is indicated at 8. This is for normal or selective release of bombs from the racks, one at a time. Preferably bombs are released first from one rack, and when that rack is empty, from the opposite rack. For selective release also it is necessary to insure that the doors be opened and the bomb racks fully projected, before selective release is permitted. It is also necessary that the control handle 6 be in the selective position. To these ends we provide a safety switch 80 in circuit with the firing key 8, which is closed by a cam 81 on the link 60 when this link and the control handle 6 are in the selective position, but not otherwise. The same circuit includes one or the other of the solenoids 93, the particular one selected being controlled by a switch 82 and the switches 71, previously referred to. While the solenoid 7 is connected to the switches 71 it is not part of the firing key circuit for the reason that with parts in the selective position the switch 70 remains open and no current can therefore pass through the solenoid 7.

It now becomes evident that the firing key may be pressed with parts in the locked position, whether or not the bomb rack be projected, and no release is effected, because the switch 80 is open. If the handle 6 is in the selective position, closing the switch 80, and the firing key is pressed, the solenoid 93 cannot be energized unless the switches 71 are closed, and these are only closed when the bomb racks are both in the projected or bomb-dropping position. It follows that the firing key will only operate for the selective release of bombs when the bomb racks are fully projected and the control handle is, in addition, in the proper selective position. Since the bomb racks must be fully projected it follows that the doors must have been opened, and indeed, if the bomb racks are of the fixed type and not projectible, the switches 71 may be arranged to be closed by the completion of the opening movement of doors, so that in such an installation the selective release of bombs is interdicted until the doors are opened.

Since the operation of the several parts and systems has been described in connection with each one, it is believed that it is not necessary to give any further detailed description of the operation of this invention. Whenever it is desired to release bombs, the control handle 43 is moved from the "off" position to the "extended" position, accomplishing in sequence, and without further attention, opening of the doors, release of the locks 21, and projection of the two racks 9. The racks are now ready to release bombs, and the control handle 6 is now moved from the locked position to the selective or beyond to the salvo position. If it moves to the salvo position the bombs are immediately released from both racks at once, and all bombs substantially simultaneously. If the control handle 6 is left in the selective position, in order to accomplish release of bombs it is necessary to press the firing key 8, and for each closure of the circuit through the firing key a bomb is released from one rack. Upon dropping all the bombs from one rack the switch 82 may be thrown, and this may be done manually or automatically, as is known in the art, whereupon upon further pressure on the firing key bombs are released one by one from the opposite rack. When all bombs have been dropped that it is desired to drop, or the rack are emptied, the control handle 43 is moved to the retracting position and, in order, the racks are retracted, are locked in place, and the doors are closed, restoring the general streamline surface of the aircraft structure.

In order to enable the several operations, as projection and retraction of the rack, or opening and closing of the doors, to be performed should the electric circuits or supply fail, various manual controls may be provided, but as these are of an emergency nature, and the manner of their connection and employment would be obvious, and their installation and operation would not involve invention, it has not been thought necessary to illustrate them.

What we claim as our invention is:

1. In combination with an airplane structure having an opening therein, a door normally closing said opening, a bomb rack supported in normally retracted position within said structure, a lock normally holding the bomb rack in such retracted position, a pressure cylinder to open and close the door, a pressure cylinder to release the lock, and a pressure cylinder to project the bomb rack through the opening into bomb-dropping position, and to retract it from such position, and a pressure circuit including control valves interconnecting the several pressure cylinders in series for admission of pressure fluid thereto successively to enforce their operation in the sequence of opening the door, releasing the lock, and projecting the rack.

2. In combination with an airplane structure having an opening therein, a door normally closing said opening, a bomb rack supported in normally retracted position within said structure, a lock normally holding the bomb rack in such retracted position, a pressure cylinder to open and close the door, a pressure cylinder to release the lock, and a pressure cylinder to project the bomb rack through the opening into bomb-dropping position, to retract it from such position, and a pressure circuit including a plurality of control valves which interconnect the several pressure cylinders in series for admission of pressure fluid thereto successively, and control valve operating means to regulate the series order of connection of said pressure cylinders in the pressure circuit, and interengaging all said control valves for simultaneous movement from a position wherein the pressure cylinders are connected in a series to receive the pressure fluid to enforce their operation in the sequence of opening the door, releasing the lock, and projecting the rack, into a position to interconnect the several pressure cylinders in a series to receive the pressure fluid to enforce their operation in the sequence of retracting the rack and closing the door, the lock being reengaged following retraction of the rack.

3. In combination with a bomb rack and means guiding the same for movement into and from a bomb-dropping position, bomb releasing means including an arm mounted on and movable with the rack, a shaft parallel to the direction of movement of the rack, whereon the arm is slidably and non-rotatively secured, and means operable from a distant point for rocking said shaft.

4. In combination with a bomb rack and means guiding the same for movement into and from a bomb-dropping position, bomb releasing means including an arm mounted on and movable with the rack, a shaft parallel to the direction of movement of the rack, lengthwise of which shaft the arm is slidable, and whereon it is non-rotatively secured, means operable from a distant point for rocking said shaft, and means interdicting rocking the shaft for release of a bomb until the rack has reached bomb-dropping position.

5. In combination with a bomb rack and means guiding the same for movement into and from a bomb-dropping position, bomb releasing means including an arm mounted on and movable with the rack, a shaft parallel to the direction of movement of the rack, whereon the arm is slidable lengthwise, but relatively non-rotatively, means operable from a distant point for rocking said shaft and including a stop shoulder shiftable as the shaft is rocked, a solenoid-released stop pin engageable with said shoulder, a switch in the circuit of said solenoid, and means carried by the rack and engageable with said switch to close the circuit and permit rocking of the shaft, only when the rack reaches its bomb-dropping position.

6. In combination with a bomb rack and means guiding the same for movement into and from a bomb-dropping position, bomb releasing means including a member operatively connected to and distant from the rack and shiftable from an inoperative to a bomb-releasing position, means to interdict shifting of said member into bomb-releasing position, and means controlled by the rack, as the latter reaches its bomb-dropping position, to release said shiftable member for movement into bomb-releasing position, at will.

7. In combination with a bomb rack and means guiding the same into and from a bomb-dropping position, salvo releasing means including a selector device independent of the rack and shiftable from a selective to a salvo release position, and bomb release means on the rack operatively connected thereto, means in the path of movement of the selector device to interdict its movement into salvo release position, an electrical circuit including a solenoid for the release of said interdicting means, a switch in said circuit closable only as the selector device moves between selective and salvo positions; and another switch in said circuit closable only when the rack is in its bomb-dropping position, whereby bombs may be salvo-released only when the bomb rack is in bomb-dropping position and the selector device is also moved to salvo release position.

8. In combination with a bomb rack and means guiding the same for movement into and from a bomb-dropping position, a ring member operatively connected to the rack, manual safety means shiftable to and from a selective firing position, in which a bomb may be released, and means controlled by the safety means to render the firing member inoperative to release a bomb except when such safety means have been manually shifted to the selective position, and further safety means controlled by the rack to render the firing member inoperative except when the rack is in its bomb-dropping position, regardless of the position of said manually shiftable safety means.

9. In combination with a bomb rack and means guiding the same for movement into and from a bomb-dropping position, an electrical circuit including bomb-releasing means mounted upon the rack, a firing key in said circuit, a selector means movable into and from a selective position, in which a bomb may be released, a switch in said circuit closable by the selector means only when the latter is in selective position, and another switch in said circuit closable only when the rack is in its bomb-dropping position, whereby a bomb may be released by the firing key only when the selector means is in selective position and the rack is also in bomb-dropping position.

10. In combination with an airplane structure having an opening therein, a bomb rack mounted in the airplane structure adjacent the opening, a door normally closing the opening, bomb-releasing means including a selector device shiftable from a selective position to a salvo release position, bomb release means on the rack operatively connected thereto, means in the path of movement of the selector device to interdict such movement into salvo release position, an electrical circuit including a solenoid for the release of said interdicting means, a switch in said circuit closable only as the selector device moves between selective and salvo positions, and another switch in said circuit closable only after the door has reached its open position, whereby bombs may be salvo-released only when the door is in open position and the selector device is also moved to salvo release position.

11. In combination with an airplane structure having an opening therein, a bomb rack mounted in the airplane structure adjacent the opening, a door normally closing the opening, an electrical circuit including bomb-releasing means mounted upon the rack, a firing key in said circuit, a selector means movable into and from a selective position, in which a bomb may be released, a switch in said circuit closable by the selector means only when the latter is in selective position, and another switch in said circuit closable only after the door has been moved to open position, whereby a bomb may be released by the firing key only when the selector means is in selective position and the door is also open.

12. In combination with an airplane structure having an opening in a wall thereof, a bomb rack receivable with a bomb supported thereby in a retracted position within the airplane structure, means guiding said bomb rack for reciprocation between its retracted position and a projected position with the bomb projected through the wall opening beyond the outer surface of the wall, means reciprocable in a direction generally perpendicular to the wall opening engaging said rack to effect such reciprocation thereof, a lock normally operable to hold said bomb rack in its retracted position but releasable for movement of the rack by said reciprocable means, a door normally closing the wall opening, door opening means, and control means for said lock inoperable to release the lock for movement of the bomb rack prior to operation of said door opening means to move the door to uncover the wall opening.

13. In combination with an airplane structure having a side wall apertured substantially conterminous with a shallow cavity adjacent to such wall, a substantially planar upright frame adapted to suspend a tier of bombs from one side thereof out of contact with the airplane structure, and within such cavity between such frame and the apertured side wall, track members secured to the airplane structure at top and bottom of the cavity, and disposed perpendicular to the side wall aperture, rollers carried by said frame and engaging said tracks to guide the frame for horizontal movement to project the tier of bombs through the side wall aperture to a position projecting beyond the outer surface of the wall, actuating means operable to move said frame along the tracks, two bomb releasing means operable when the rack is thus projected, one for salvo release of all bombs, and one for selective release of single bombs, and means to interdict release of any bomb, by either such releasing means, until the rack is fully projected.

CHARLES N. MONTEITH.
ELLIOTT G. EMERY, Jr.